US006222167B1

United States Patent
Wada et al.

(10) Patent No.: US 6,222,167 B1
(45) Date of Patent: *Apr. 24, 2001

(54) IMPEDANCE MATCHING APPARATUS FOR INDUCTION HEATING TYPE GALVANIZED STEEL SHEET ALLOYING SYSTEM AND METHOD

(75) Inventors: Kozo Wada; Etsurou Hirai; Kazuya Tsurusaki; Yuuji Asahara, all of Hiroshima; Kwang-Hee Han, Tokyo; Jae-Young Lee, Tokyo; Kyung-Zoon Min, Tokyo, all of (JP); Kwang-Hum Han, Kwangyang-shi (KR)

(73) Assignee: Mitsubishi Heavy Industries, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/205,290

(22) Filed: Dec. 4, 1998

(30) Foreign Application Priority Data

Dec. 5, 1997 (JP) ..................................... 9-335232

(51) Int. Cl.⁷ ..................................... H05B 6/10

(52) U.S. Cl. .................. 219/645; 219/636; 219/656; 219/661; 373/139; 373/148

(58) Field of Search ..................................... 219/615, 635, 219/645, 656, 660, 661, 666; 118/620; 373/138, 139, 147, 148

(56) References Cited

U.S. PATENT DOCUMENTS

| 4,204,147 | 5/1980 | Larrabee . |
| 4,634,958 | 1/1987 | Cornwell . |
| 4,845,332 | 7/1989 | Jancosek et al. . |
| 5,156,683 | * 10/1992 | Ross ..................................... 118/620 |
| 5,691,685 | 11/1997 | Delucia . |

FOREIGN PATENT DOCUMENTS

| 1192343B | 5/1965 | (DE) . |
| 0295099 | 12/1988 | (EP) . |
| 2498407A | 7/1982 | (FR) . |
| 2260470 | 4/1993 | (GB) . |
| 60-225391 | 11/1985 | (JP) . |
| 4228528 | 8/1992 | (JP) . |
| 4294091 | 10/1992 | (JP) . |
| 5320852 | 12/1993 | (JP) . |
| 7102355 | 4/1995 | (JP) . |
| 7249479 | 9/1995 | (JP) . |
| 8148063 | 6/1996 | (JP) . |

OTHER PUBLICATIONS

Patent Abstracts of Japan, vol. 1998, No. 14, Dec. 31, 1998—abstract for JP 10–241846 A, published Sep. 1, 1998.

Patent Abstracts of Japan, vol. 1996, No. 01, Jan. 31, 1996—abstract for JP 7–249479 A, published Sep. 26, 1995.

* cited by examiner

Primary Examiner—Tu Ba Hoang

(57) ABSTRACT

An alloying system for a galvanized steel sheet, the alloying system using an induction heating coil, wherein an impedance matching apparatus is provided between the induction heating coil and a high frequency power source. The impedance matching apparatus comprises a matching transformer having a plurality of intermediate contact points for arbitrarily selecting a turn ratio, and a switching device for alternative changeover of the intermediate contact point, whereby even when the load impedance of the steel sheet varies, maximum power source output is obtained, such that an appropriate heating temperature necessary for forming an alloy layer of the steel sheet can be supplied.

8 Claims, 10 Drawing Sheets

Example of Short-Circuiting Switch Combined with Matching Transformer
(Front View)

Example of Short-Circuiting Switch Combined with Matching Transformer
(Side View)

FIG. 6
PRIOR ART
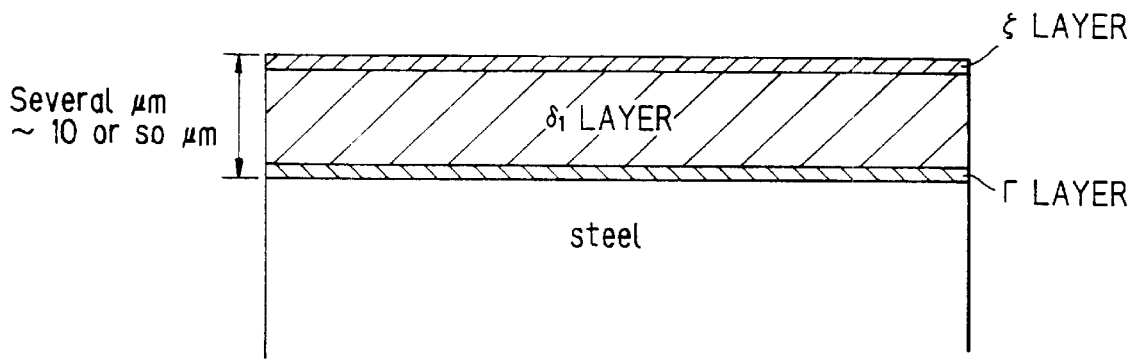
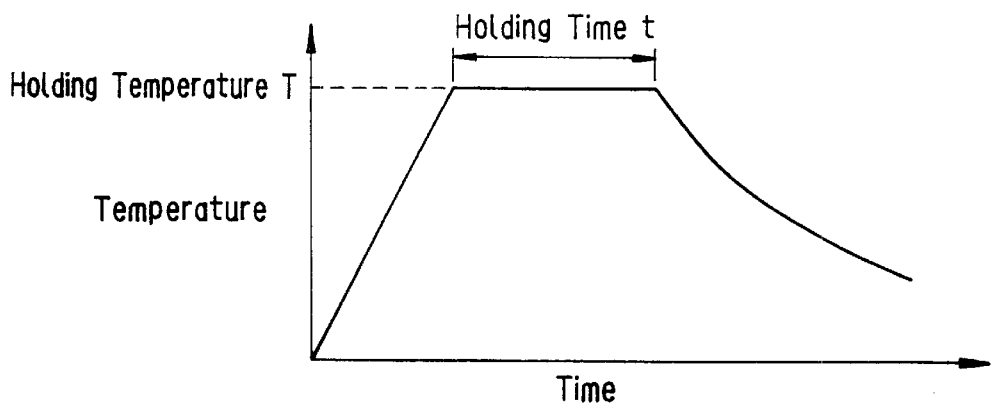
FIG. 7(a) Heat Cycle for Alloying of Zinc Coating Layer
PRIOR ART
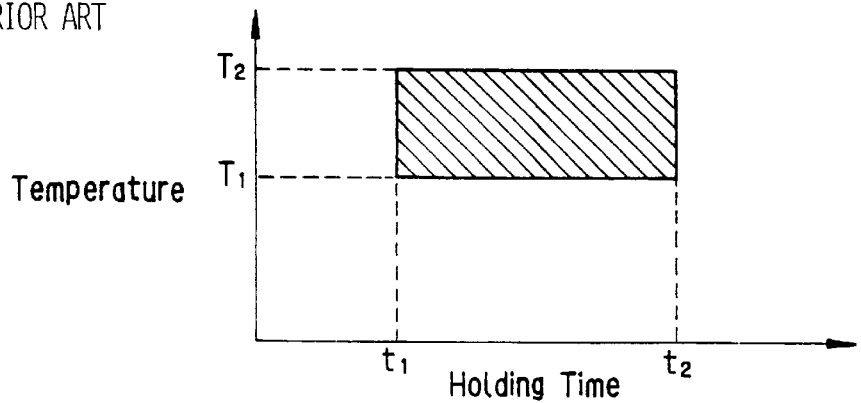
FIG. 7(b) Concept View of Suitable Conditions for Heating
PRIOR ART

IMPEDANCE MATCHING APPARATUS FOR INDUCTION HEATING TYPE GALVANIZED STEEL SHEET ALLOYING SYSTEM AND METHOD

FIELD OF THE INVENTION

The present invention relates to an induction heating type galvanized steel sheet alloying system, a high frequency heating apparatus, an impedance matching apparatus, and an impedance transforming method. More specifically, the invention relates to those useful as or in an alloying system for a galvanized steel sheet, especially in an output controller for an induction heating power source for the formation of an alloy layer of the galvanized steel sheet.

BACKGROUND OF THE INVENTION

A continuous alloying treatment furnace for a hot dip zinc coated steel sheet is provided above a zinc pot 2 which applies galvanization to a steel sheet 1, as shown in FIG. 5. That is, above the zinc pot 2, a wiping nozzle 3, a heating furnace 4, a holding furnace 5, and a cooling zone 6 are disposed upward in this order. The steel sheet 1 passing through the zinc pot 2 has its surfaces coated with zinc. After the steel sheet 1 is controlled by the wiping nozzle 3 to have a predetermined weight of coating, it is passed through the alloying treatment furnace comprising the heating furnace 4, holding furnace 5, and cooling zone 6. During this process, alloying of the coated layer is performed. As a means of obtaining a heat cycle for forming an alloy layer of the zinc coated steel sheet, an induction heating type heating furnace is used.

Such a galvanized steel sheet, which has been subjected to alloying treatment, is better inweldability, workability, paintability, and corrosion resistance than an ordinary galvanized steel sheet. Thus, it is used frequently as a steel sheet for household electrical appliances and automobiles.

Alloying treatment of a zinc coating needs to be performed to obtain an iron-zinc alloy layer composition which is ideal, particularly, for ensuring both coating adhesion and press formability at the same time. Coating adhesion and press formability are important quality factors, because the former characteristic prevents powdery peeling of the coated layer, called powdering, during working, while the latter results in an alloy layer with a low sliding resistance, thereby reducing a load during forming. In detail, the surface of the steel sheet after alloying treatment should have a coating composition consisting mainly of a $\delta_1$ phase while minimizing a $\zeta$ phase with a high sliding resistance, and a hard, brittle $\Gamma$ phase which deteriorates powdering resistance, as shown in FIG. 6.

The constitution of the alloy layer is determined by a heat cycle of heating, holding, and cooling, which have to fulfill the following requirements as shown in FIGS. 7(a) and 7(b):

(1) Heating: Rapid heating for suppressing the $\zeta$ phase.

(2) Holding: Control of the holding temperature and holding time such that the minimum temperature is $T_1$ or higher, and the holding time is $t_1$ or longer, for suppression of the $\zeta$ phase, and that the maximum temperature is $T_2$ or lower, and the holding time is $t_2$ or shorter, for suppression of the $\Gamma$ phase.

(3) Cooling: Rapid cooling for suppressing the $\zeta$ phase.

It is well known that induction heating is suitable as means of obtaining rapid heating and a highly accurate heating temperature (=holding temperature) among the above requirements. Various induction heaters for alloying have been proposed (e.g., Japanese Unexamined Patent Publication Nos. 294091/92, 228528/92 and 320852/93).

The appropriate holding temperature ($T_2-T_1$) and the appropriate holding time ($t_2-t_1$) vary with the weight of coating, and also vary with the type of steel of the steel sheet.

FIG. 8 shows an example of circuit configuration of an induction heater.

A material 8 to be heated is passed through a solenoid coil 7, and a high frequency current of a frequency from several kHz to 100 kHz is applied to the solenoid coil 7 to flow eddy currents into the material 8, thereby to heat the material 8. The generated heat distribution and the temperature distribution, in the width direction, of the material 8 to be heated by induction heating vary with the type and width of the material 8 as well as the frequency of induction heating. The oscillation frequency of the source of induction heating is nearly in synchronism with the frequency of a resonance circuit composed of the heating coil and the capacitor. Thus, the frequency of the high frequency current flowing in the heating coil is determined by the capacity of the resonating capacitor and the inductance of the solenoid coil. The inductance of the solenoid coil is determined by its shape and number of turns.

The constitution of an apparatus for induction heating, in a heating furnace, is as shown in FIG. 8, and this apparatus can be replaced by an equivalent circuit shown in FIG. 9. The impedance of the load, as viewed from a power source output side in FIG. 9, is given by the equation (1) based on the inductance L of the coil, the capacity C of the capacitor, and the combined resistance R:

$$Z \approx (L/CR) \qquad (1)$$

Thus, the impedance of the load, as viewed from the power source output side, varies with the shape and type of the material to be heated, as well as the coil impedance in the high frequency power source circuit and the capacity of the capacitor. The relation of the equation (2) holds for the voltage V, the current I and the impedance Z:

$$V = ZI \qquad (2)$$

The output P of the high frequency power source is given by the equation (3) based on the voltage V, the current I and the power factor $\cos\theta$:

$$P = VI \cos\theta \qquad (3)$$

Thus, the high frequency power source produces power of the equation (3) from the voltage following the equation (2), and the current.

The voltage and current produced by the high frequency power source have their maximum values determined by the capacity of the power source. The output voltage and output current of the power source have a relationship as shown in FIG. 10. The equation (3) and FIG. 10 show that the output of the power source is maximal at the impedance $Z_{a2}$, the voltage $V = V_{max}$, and the current $I = I_{max}$. When the impedance is $Z_b$, which is greater than $Z_a$, the maximum value of the output is restricted by the maximum value of voltage, $V_{max}$. When the impedance is $Z_c$, which is less than $Z_a$, by contrast, the maximum value of the output is restricted by the maximum value of current, $I_{max}$.

With the configuration of the induction heater shown in FIG. 8, therefore, the impedance of the load varies when the shape or type of the material to be heated changes. As a result, maximum output of the power source is restricted. This may make it impossible to reach the heating temperature necessary for alloying. Hence, there is need for a method which can perform impedance matching easily and appropriately. There is also need for a galvanized steel sheet alloying system which can give an output close to the maximum value of the output of the power source to variously shaped material to be heated, and which enables alloying treatment to be performed at the necessary heating temperature.

SUMMARY OF THE INVENTION

The present invention has been accomplished in the light of the above-described earlier technologies. An object of this invention is to provide an alloying treatment system, etc. for a galvanized steel sheet, equipped with an apparatus which carries out impedance matching easily and appropriately to supply an appropriate heating temperature necessary for formation of an alloy layer of the galvanized steel sheet by using an induction heater.

A main constitution of the present invention for attaining the above object is characterized by:

(1) Involving a method for transforming impedance on a load side, as viewed from a high frequency power source, by an impedance matching apparatus which has a matching transformer provided with intermediate contact points (taps) based on a plurality of turn ratios, and which also has a tap selector device with low inductance and capable of passing a high frequency large current.

BRIEF DESCRIPTION OF THE DRAWINGS

The present invention will become fully understood from the detailed description given hereinbelow and the accompanying drawings which are given by way of illustration only, and thus are not limitative of the present invention, and wherein:

FIG. 6 is an explanation drawing showing a surface structure of a galvanized steel sheet after alloying treatment;

FIGS. 7(a) and 7(b) are characteristics graphs showing the range of suitable conditions for a heat cycle in alloying treatment;

PREFERRED EMBODIMENTS OF THE INVENTION

Figure 11:
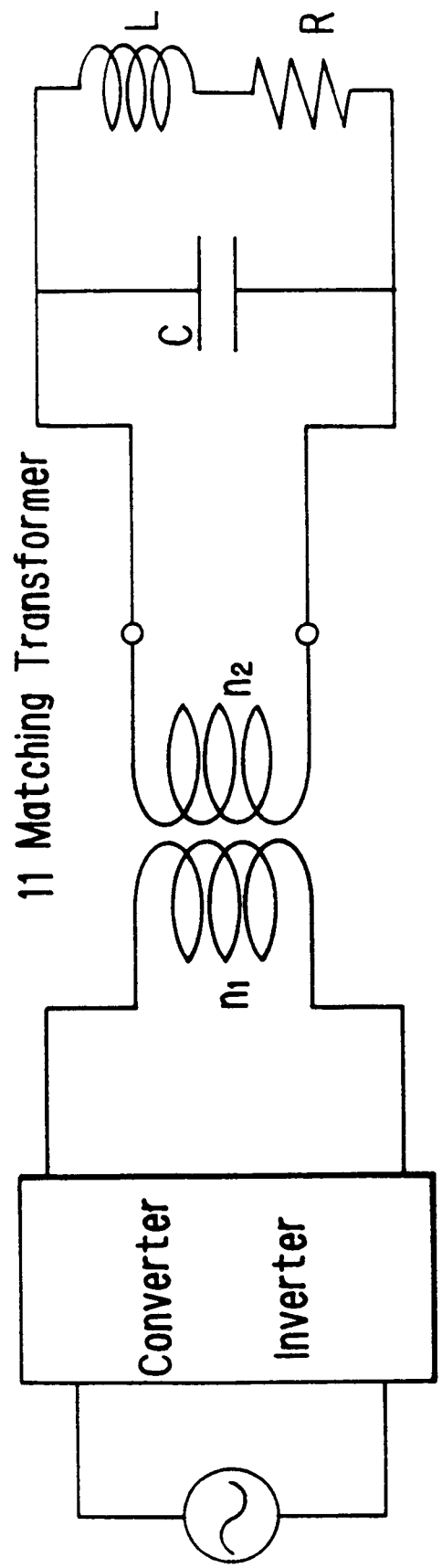
FIG. 11 is an equivalent circuit diagram of a constitution showing an induction heater according to an earlier technology.

A matching transformer 11 for matching impedances, as shown in FIG. 11, was used in a conventional impedance matching apparatus. Let the number of turns on the primary winding of the matching transformer 11 on a high frequency power source side be $n_1$, the number of turns on the secondary winding of the matching transformer 11 on a load side be $n_2$, the impedance of the load as viewed from the secondary winding of the matching transformer 11 be $Z_2$, and the impedance of the load as viewed from the high frequency power source be $Z_1$. $Z_1$ is expressed as in the equation (4):

$$Z_1=(n_1/n_2)^2 Z_2 \qquad (4)$$

Thus, the matching transformer 11 was used, and an appropriate turn ratio is selected to obtain maximum output from the power source, whereby the impedance on the load side can be transformed. With the conventional apparatus, however, changing of the turn ratio was not easy.

Under these circumstances, the present invention adopts several numbers of turns of the secondary winding of a matching transformer, and adds the function of switching the junction by means of a switching device. A circuit configuration according to its concrete embodiment is shown in FIG. 1.

Figure 1:
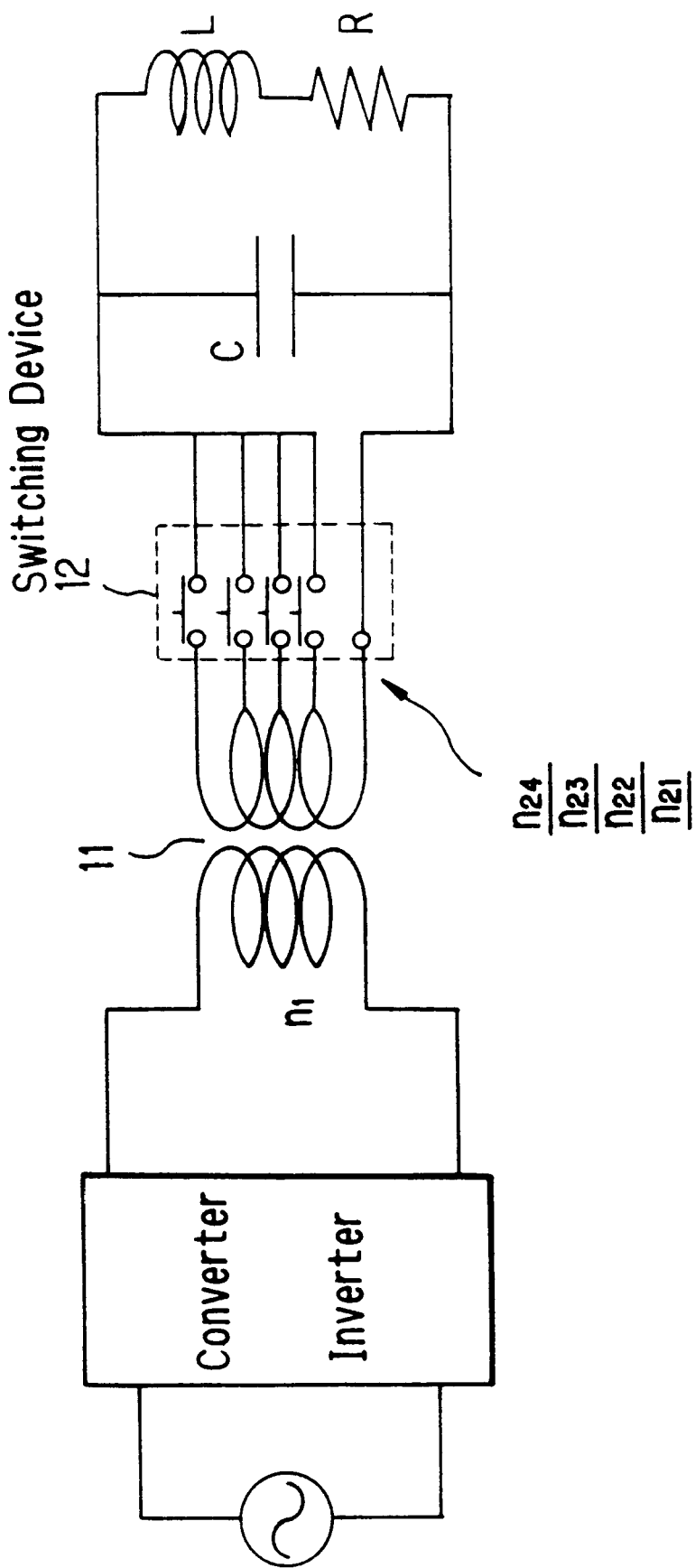
FIG. 1 is a constitution drawing of an apparatus according to a first embodiment of the present invention.

FIG. 1 shows a switching device 12 having a plurality of intermediate contact points-(taps) for arbitrarily selecting a turn ratio. Changeover by this switching device 12 enables the number of turns, $n_2$, of the secondary winding of the matching transformer to be selected on a scale of four grades, $n_{21}$, $n_{22}$, $n_{23}$ and $n_{24}$. However, there are no restrictions to the number of turns and the number of terminals of the secondary winding.

Let an impedance which can take maximum output from the power source be $Z_a$. When the impedance, during induction heating, of a steel sheet mounted is less than $Z_a$, the number of turns, $n_2$, is switched to $n_{21}$, $n_{22}$, $n_{23}$ or $n_{24}$ so that $n_1/n_2$ will become greater than that in the initially set conditions. When that impedance is greater than $Z_a$, by contrast, the number of turns, $n_2$, is switched to $n_{21}$, $n_{22}$, $n_{23}$ or $n_{24}$ so that $n_1/n_2$ becomes less than that in the initially set conditions. By so doing, that impedance of a value close to the impedance $Z_a$ can be selected, although its value may not be exactly the same as $Z_a$. Thus, it becomes possible to fully use the output capacity of the power source, and the induction heating of a steel sheet of a varying width, thickness or type can be carried out using a single power source.

Figure 2:
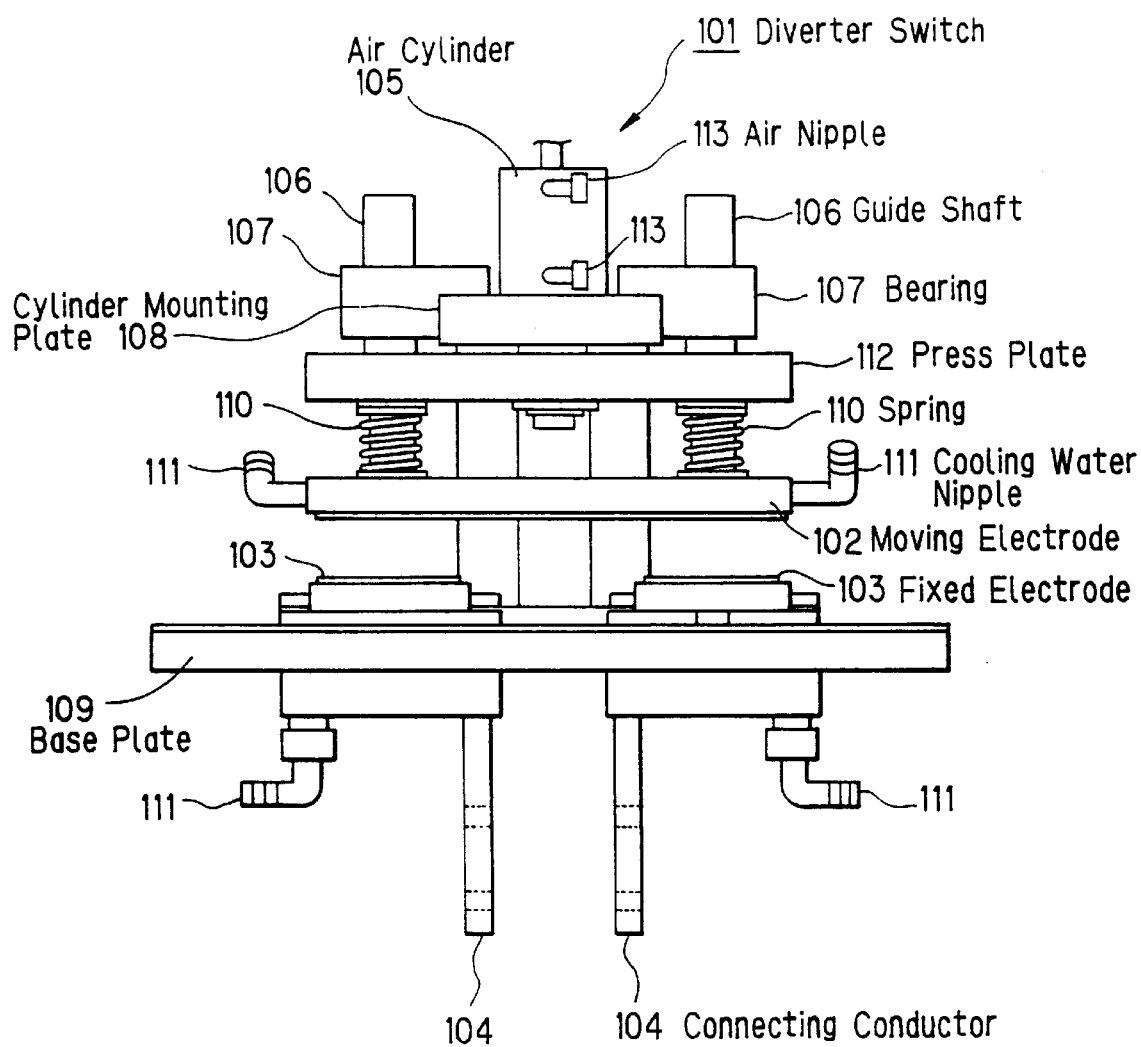
FIG. 2 is a constitution drawing of a short-circuiting switch for use in tap changing of a circuit shown in FIG. 1.

As an example of the switching device 12, a diverter switch 101, as shown in FIG. 2, can be used (Japanese Unexamined Patent Publication No. 148063/96). This diverter switch 101 opens and closes a gap between fixed electrodes 103, 103 by moving a moving electrode 102 upward and downward in FIG. 2 by means of an air cylinder 105. The reference numeral 104 denotes a connecting conductor, 106 a guide shaft, 107 a bearing, 108 a cylinder mounting plate, 109 a base plate, 110 a spring, 111 a cooling water nipple, 112 a press plate, and 113 an air nipple.

A single diverter switch 101 of FIG. 2 is used for one intermediate contact point. Since a plurality of intermediate terminals are present on the secondary winding side of the matching transformer 11, the same number of the diverter switches 101, shown in FIG. 2, as the number of the intermediate terminals are used.

Figure 3:
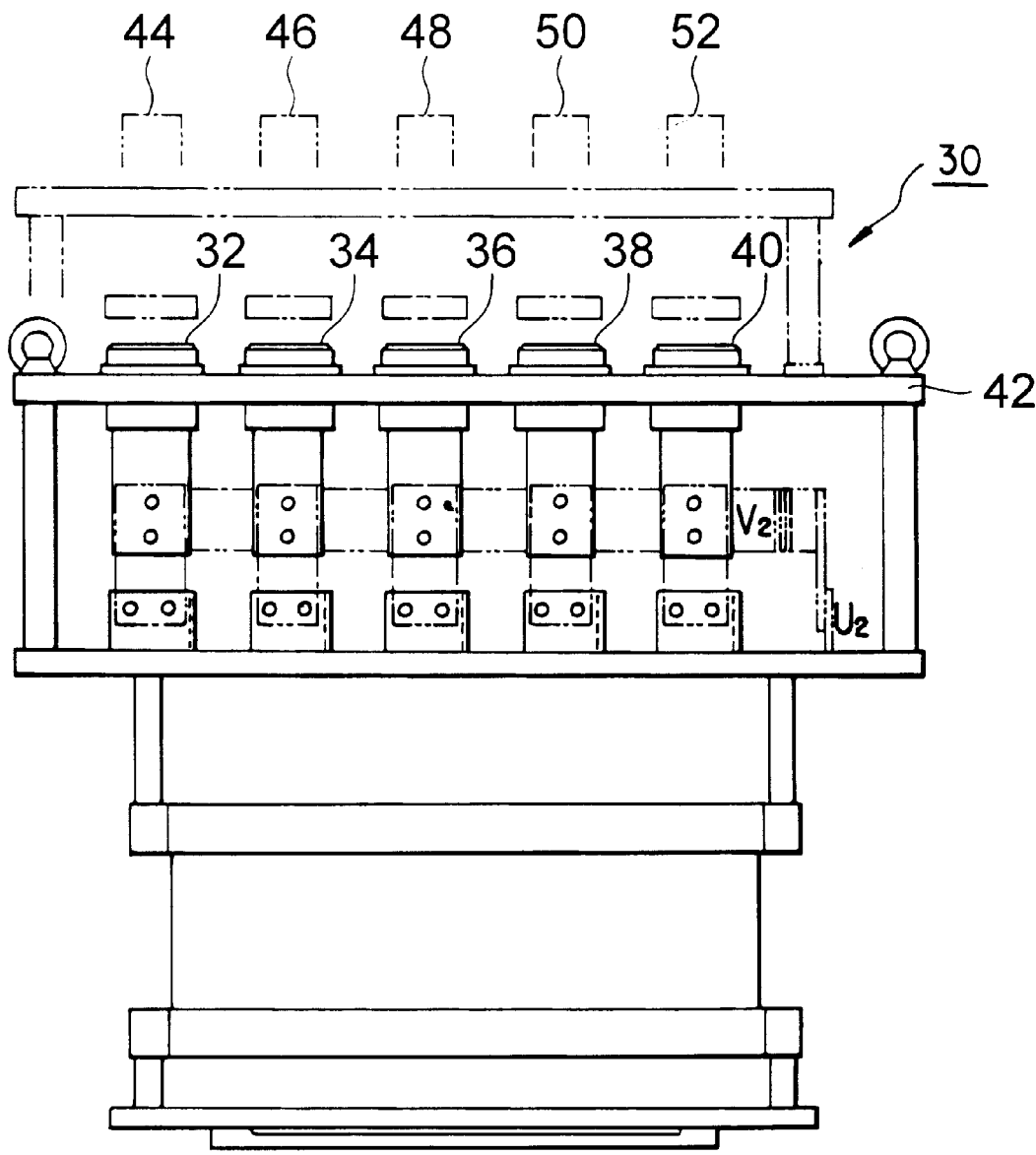
FIG. 3 is a constitution drawing of the short-circuiting switch combined with a matching transformer for use in the circuit shown in FIG. 1.
Figure 4:
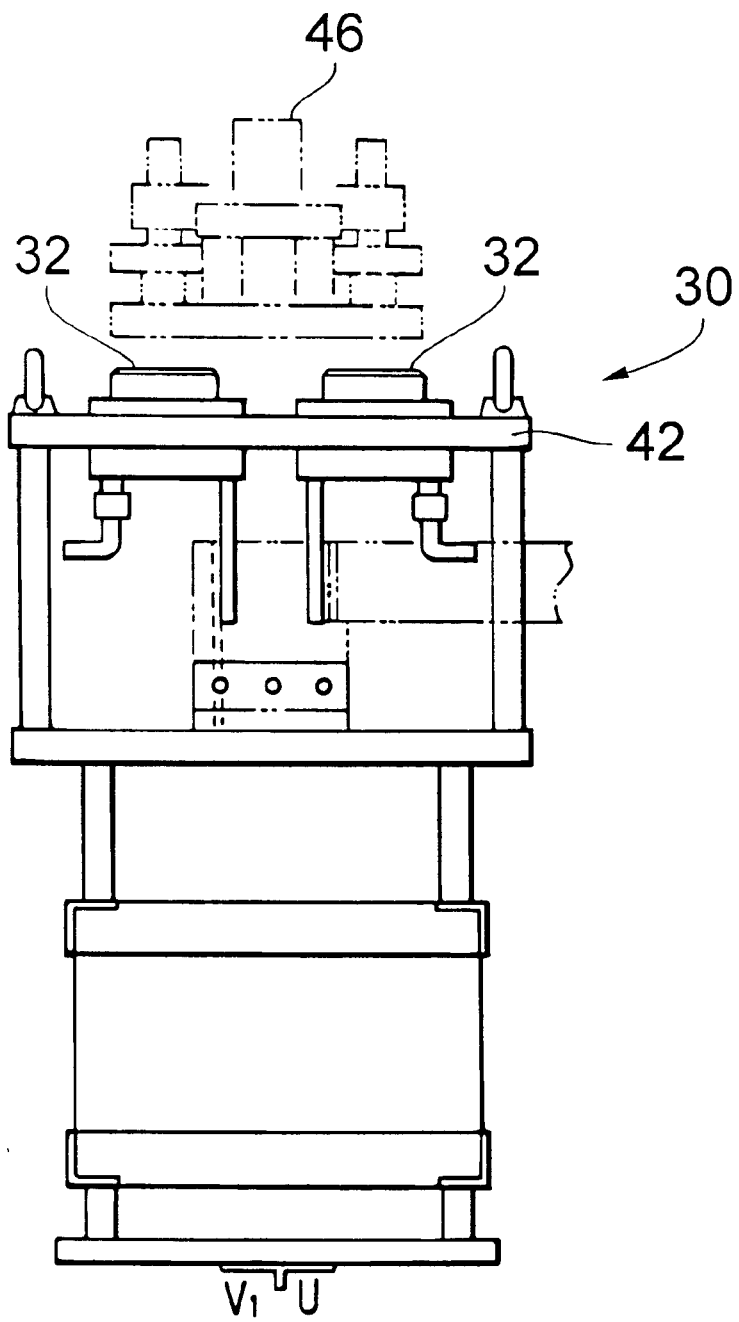
FIG. 4 is another constitution drawing of the short-circuiting switch combined with the matching transformer for use in the circuit shown in FIG. 1.

The matching transformer 11 may be integral with the diverter switch 101 shown in FIG. 2. An example of this integrated device is shown in FIGS. 3 and 4. This integral type matching transformer 30 has five pairs of connecting terminals 32, 34, 36, 38, 40 provided on a base plate 42, and uses five switching devices 44, 46, 48, 50, 52 that connect one of the five pairs of connecting terminals 32, 34, 36, 38, 40 to perform change over of the terminal. Even when the matching transformer 30 shown in FIGS. 3 and 4 is used, therefore, the number of turns on the secondary winding of the matching transformer can be switched to an optimal value.

Figure 5:
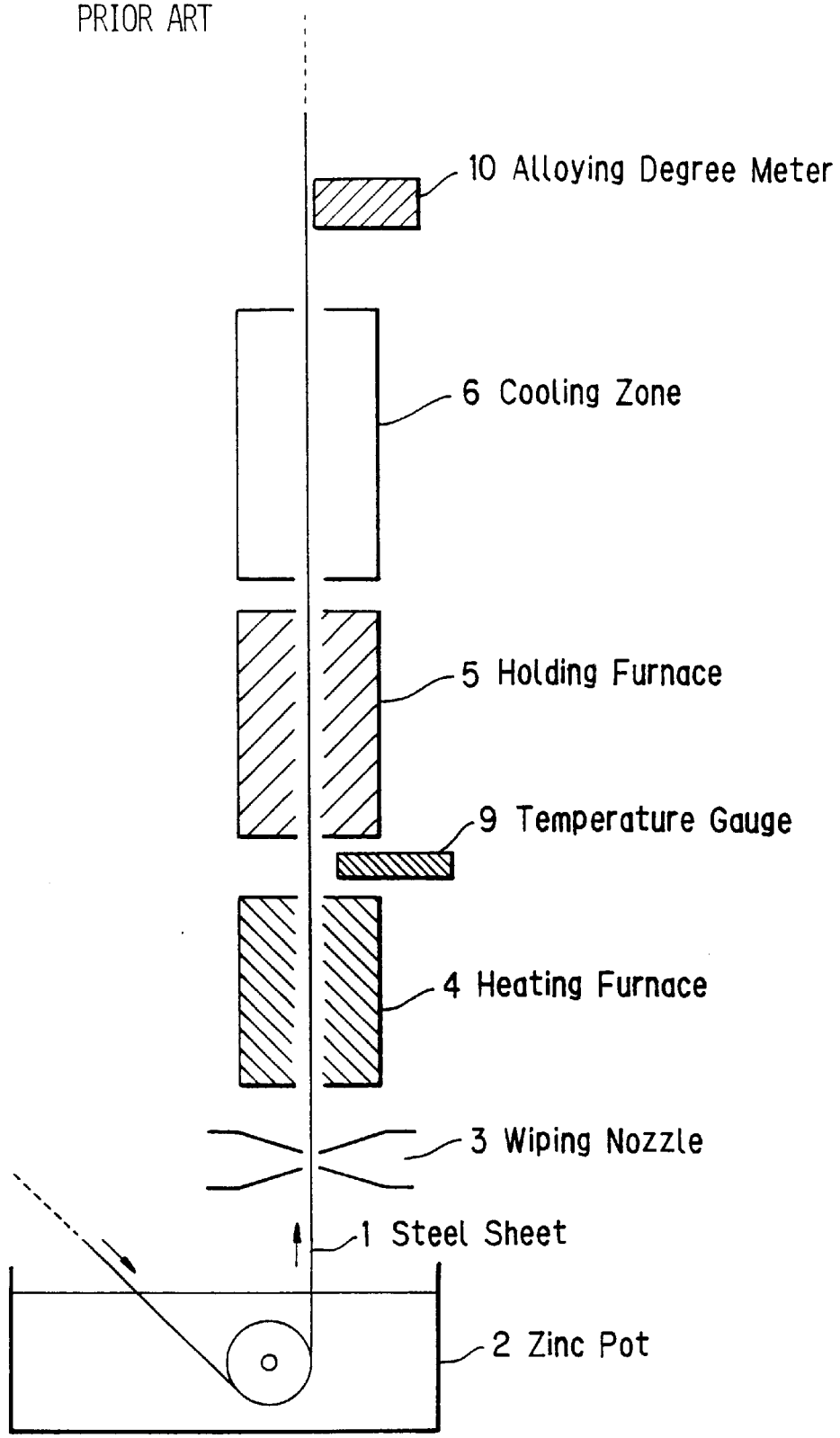
FIG. 5 is an explanation drawing conceptually showing a continuous alloying apparatus for a galvanized steel sheet according to an earlier technology.
Figure 8:
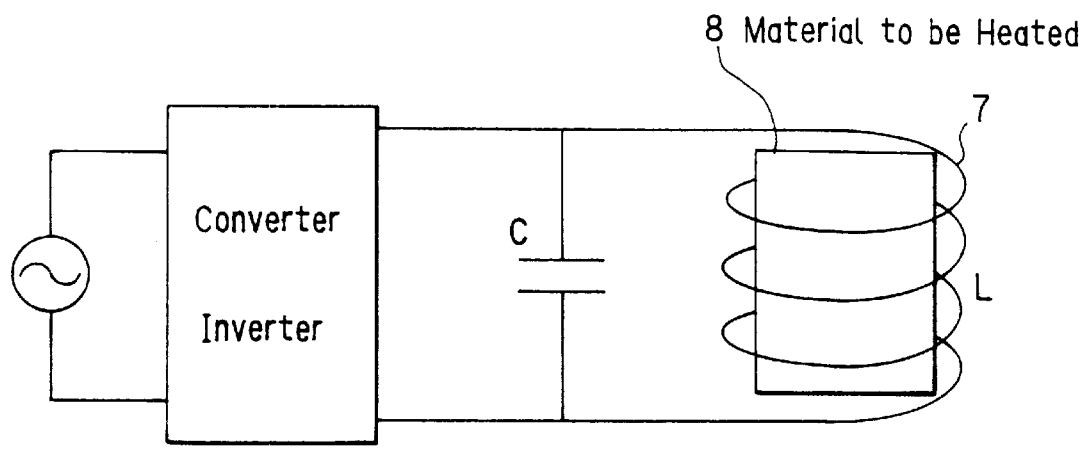
FIG. 8 is a constitution/circuit diagram showing an induction heater according to an earlier technology.
Figure 9:
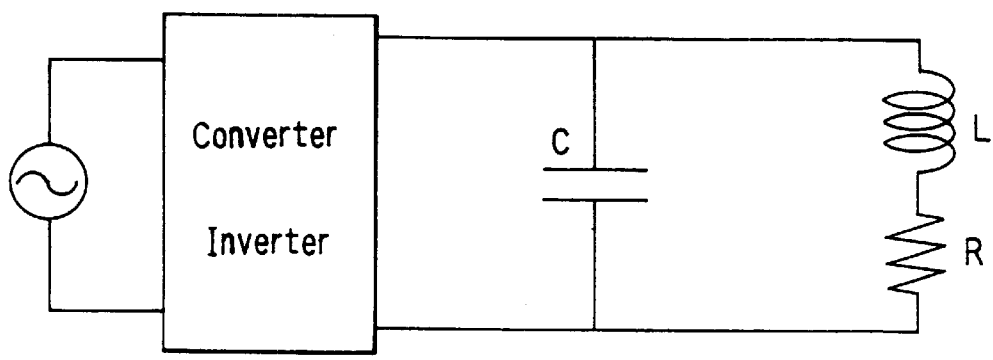
FIG. 9 is an equivalent circuit diagram of a constitution showing an induction heater according to an earlier technology.
Figure 10:
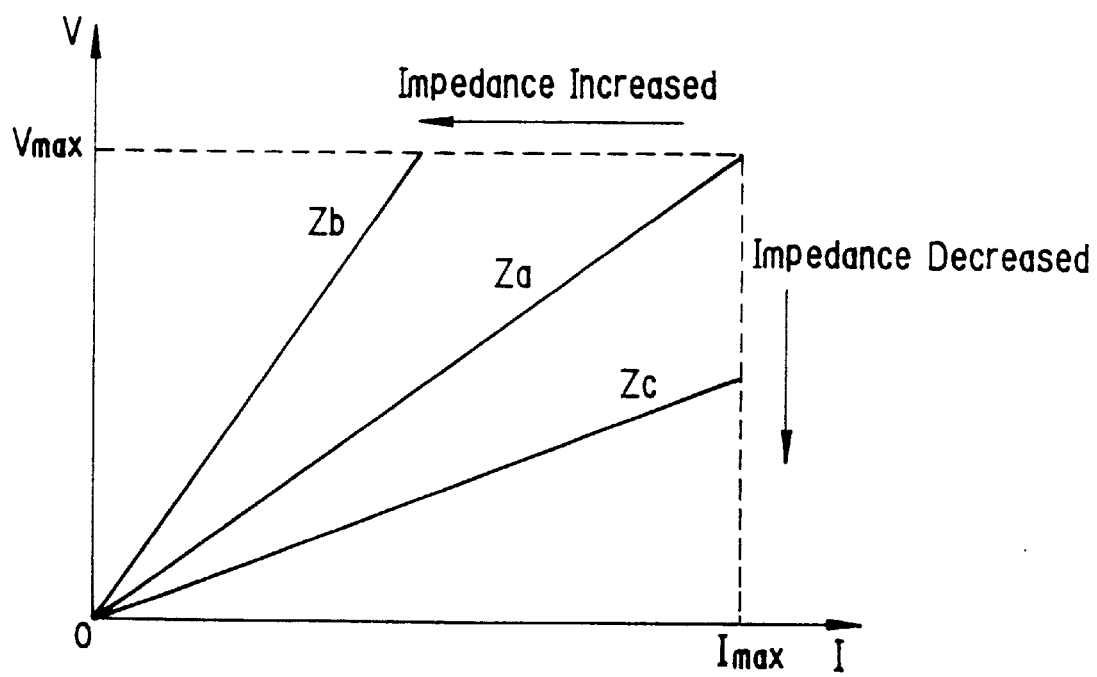
FIG. 10 is a characteristics graph showing the relationship between voltage and current according to the impedance of the load.
Figure 12:
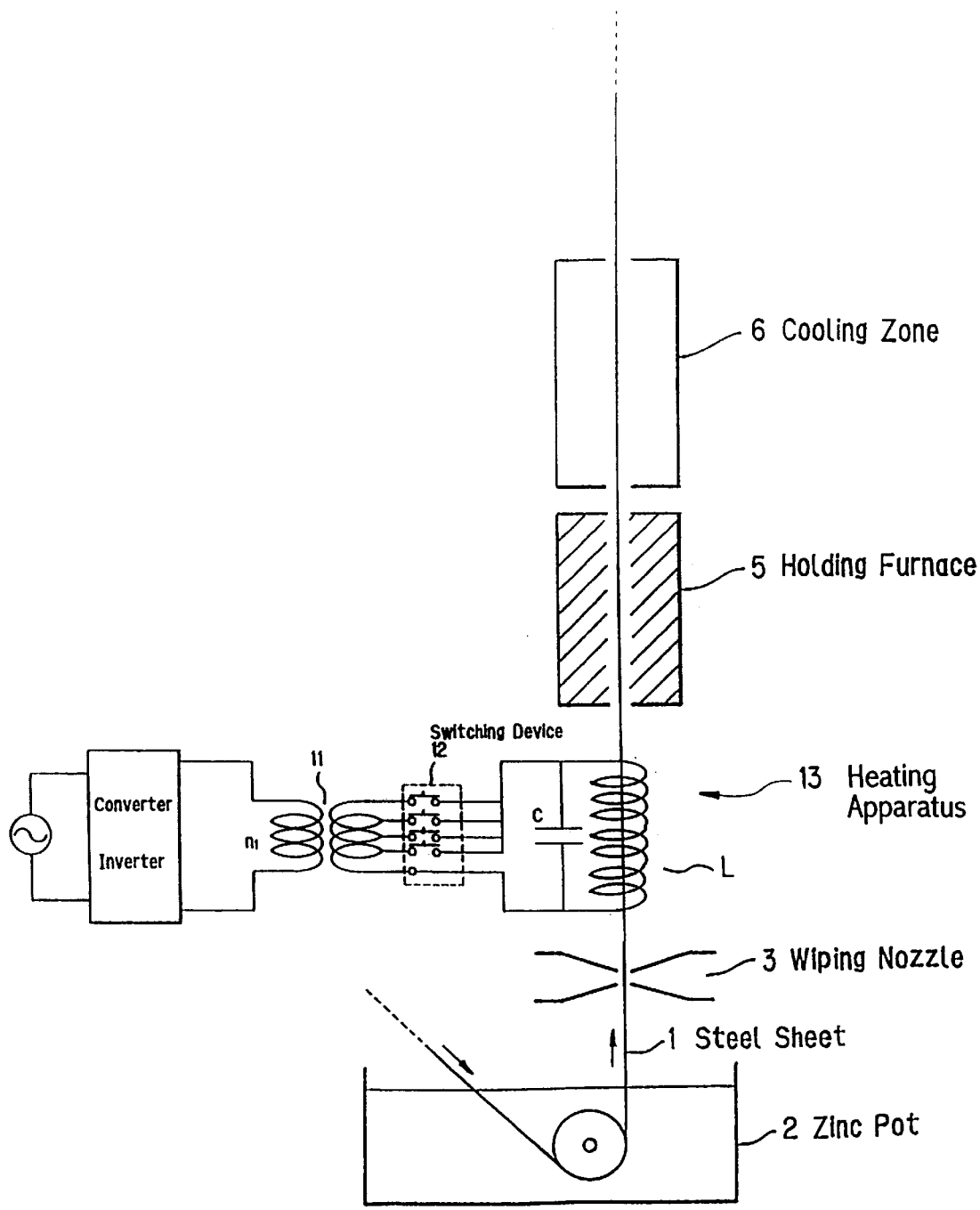
FIG. 12 shows a continuous alloying apparatus for a galvanized steel sheet including a high frequency heating apparatus.

FIG. 12 shows a galvanized steel sheet alloying system provided with a high frequency heating apparatus 13. All other elements are similar to those shown in FIG. 5, and thus detailed explanation thereof is omitted. As shown in FIG. 12, the system is provided with a zinc pot 2, a wiping nozzle 3, a holding furnace 5, and a cooling zone 6. The high frequency heating apparatus 13 is disposed between the zinc pot 2 and the holding furnace 5 in place of the heating furnace 4 shown in FIG. 5.

The heating apparatus 13 has a matching transformer 11 provided with a switching device 12, a capacitor C, and a coil L for heating the steel sheet 1.

The present embodiments are applied to a continuous alloying treatment furnace for a hot dip galvanized steel sheet. However, the present invention is not limited thereto. For instance, it can be applied to a heating apparatus using an induction heating coil.

As described in detail above based on the embodiments, a first aspect of the present invention provides an induction heating type alloying system for a galvanized steel sheet, the alloying system using an induction heating coil, wherein an impedance matching apparatus is provided between the induction heating coil and a high frequency power source, the impedance matching apparatus comprising a matching transformer having a plurality of intermediate contact points for arbitrarily selecting a turn ratio, and a switching device for alternative changeover of the intermediate contact point. Thus, even when the load impedance of the steel sheet varies, maximum power source output is obtained. Consequently, steel sheets of various thicknesses, widths and types can be produced efficiently.

A second aspect of the present invention provides a high frequency heating apparatus in a heating system using an induction heating coil, wherein an impedance matching apparatus is provided between the induction heating coil and a high frequency power source, the impedance matching apparatus comprising a matching transformer having a plurality of intermediate contact points for arbitrarily selecting a turn ratio, and a switching device for alternative changeover of the intermediate contact point. Thus, even when the load impedance of a material to be heated varies, maximum power source output is obtained. Consequently, various materials to be heated can be heated efficiently.

A third aspect of the present invention provides an impedance matching apparatus comprising a matching transformer having a plurality of intermediate contact points for arbitrarily selecting a turn ratio, and a switching device capable of alternative changeover of the intermediate contact point, having low inductance, and capable of passing a large current of a high frequency. Thus, even when the impedance varies, maximum power source output is obtained, and processing can be performed at maximum output of the power source capacity.

A fourth aspect of the present invention provides an impedance transforming method, which comprises transforming impedance on a load side, as viewed from a high frequency power source, by means of an impedance matching apparatus comprising a matching transformer having a plurality of intermediate contact points for arbitrarily selecting a turn ratio, and a switching device capable of alternative changeover of the intermediate contact point, having low inductance, and capable of passing a large current having a high frequency. Thus, even when the impedance varies, maximum power source output is obtained, and processing can be performed at maximum output of the power source capacity.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An induction heating type alloying system for a galvanized steel sheet, comprising:

an induction heating coil;

a power source;

an impedance matching apparatus provided between said induction heating coil and said power source, said impedance matching apparatus including, a matching transformer having a plurality of pairs of intermediate contact points for arbitrarily selecting a turn ratio, wherein a first one of said contact points of each of said pairs is connected to a selective one of terminals of the secondary winding of said matching transformer, an integrated switching device for selecting one of the plurality of pairs of said intermediate contact points to select a desired turn ratio, such that a maximum power source output is obtained even when a load impedance of the steel sheet varies, said switching device being arranged to integrally accommodate the plurality of pairs of said intermediate contact points of said matching transformer, wherein said switching device consists of a plurality of integrated switches with each of said switches having a pair of fixed electrodes connected to a respective pair of said intermediate contacts points and a moving electrode, all pairs of said intermediate contact points being provided on a single base plate with the second one of said contact points of each of said pairs of contact points being connected to the induction heating coil so that each of said integrated switches corresponds to one of the pairs of said intermediate contact points, wherein one of the plurality of moving electrodes selectively moves to make contact with corresponding one of the plurality of pairs of said fixed electrodes such that said contact points of one of the plurality of pairs of said intermediate contact points are electrically connected to each other.

2. A heating system, comprising:

an induction heating coil;

a high frequency heating apparatus having an impedance matching apparatus provided between said induction heating coil and a high frequency power source, said impedance matching apparatus including, a matching transformer having a plurality of pairs of intermediate contact points for arbitrarily selecting a turn ratio, wherein a first one of said contact points of each of said pairs is connected to a selective one of terminals of the secondary winding of said matching transformer, an integrated switching device for selecting one of the plurality of pairs of said intermediate contact points to select a desired turn ratio, such that a maximum power source output is obtained even when a load impedance of a material to be heated varies, said switching device being arranged to integrally accommodate the plurality of pairs of said intermediate contact points of said matching transformer, wherein said switching device consists of a plurality of integrated switches with each of said switches having a pair of fixed electrodes connected to a respective pair of said intermediate contacts points and a moving electrode, all pairs of said intermediate contact points being provided on a single base plate with the second one of said contact points of each of said pairs of contact points being connected to the induction heating coil so that each of said integrated switches corresponds to one of the pairs of said intermediate contact points, wherein one of the plurality of moving electrodes selectively moves to make contact with corresponding one of the plurality of pairs of said fixed electrodes such that said contact points of one of the plurality of pairs of said intermediate contact points are electrically connected to each other.

3. An impedance matching apparatus, comprising:

a matching transformer having a plurality of pairs of intermediate contact points for arbitrarily selecting a turn ratio; and a switching device for selectively switching said plurality of pairs of intermediate contact points to select a desired turn ratio, wherein a first one of said contact points of each of said pairs is connected to a selective one of terminals of the secondary winding of said matching transformer, wherein said switching device consists of a plurality of integrated switches with each of said switches having a pair of fixed electrodes connected to a respective pair of said intermediate contacts points and a moving electrode, all pairs of said intermediate contact points being provided on a single base plate with the second one of said contact points of each of said pairs of contact points being connected to the induction heating coil so that each of said integrated switches corresponds to one of the pairs of said intermediate contact points, wherein one of the plurality of moving electrodes selectively moves to make contact with corresponding one of the plurality of pairs of said fixed electrodes such that said contact points of one of the plurality of pairs of said intermediate contact points are electrically connected to each other.

4. An impedance transforming method, comprising:

providing a matching transformer having a plurality of pairs of intermediate contact points for arbitrarily selecting a turn ratio, wherein a first one of said contact points of each of said pairs is connected to a selective one of terminals of the secondary winding of said matching transformer;

providing an integrated switching device for selecting one of the plurality of pairs of the intermediate contact points, said switching device integrally accommodating the plurality of pairs of said intermediate contact points of said matching transformer, said integrated switching device providing step includes the steps of, providing said switching device consisting of a plurality of integrated switches with each of said switches having a pair of fixed electrodes connected to a respective pair of said intermediate contacts points and a moving electrode, all pairs of said intermediate contact points being provided on a single base plate with the second one of said contact points of each of said pairs of contact points being connected to the induction heating coil so that each of said integrated switches corresponds to one of the pairs of said intermediate contact points; and selecting a desired turn ratio by the switching device to transform impedance on a load side, as viewed from a high frequency power source, said selecting step includes the step of, selectively moving one of the plurality of moving electrodes to make contact with corresponding one of the plurality of pairs of fixed electrodes such that said contact points of one of the plurality of pairs of said intermediate contact points are electrically connected to each other.

5. The system of claim 1, wherein said power source is a high frequency power source.

6. The apparatus of claim 3, wherein said switching device has a low inductance.

7. The apparatus of claim 3, wherein said switching device passes a large current of a high frequency.

8. A system for galvanizing a steel sheet, comprising:

a zinc pot;

an induction-type heating furnace which heats the steel sheet after applying zinc thereto in said zinc pot, said heating furnace including, an induction heating coil, a power source, and an impedance matching apparatus provided between said inducting heating coil and said power source, said impedance matching apparatus including, a matching transformer having a plurality of pairs of intermediate contact points for arbitrarily selecting a turn ratio, wherein a first one of said contact points of each of said pairs is connected to a selective one of terminals of the secondary winding of said matching transformer; and an integrated switching device for selecting one of the plurality of pairs of said intermediate contact points to select a desired turn ratio, such that a maximum power source output is obtained even when a load impedance of the steel sheet varies, said switching device being arranged to integrally accommodate the plurality of pairs of said intermediate contact points of and said matching transformer, wherein said switching device consists of a plurality of integrated switches with each of said switches having a pair of fixed electrodes connected to a respective pair of said intermediate contacts points and a moving electrode, all pairs of said intermediate contact points being provided on a single base plate with the second one of said contact points of each of said pairs of contact points being connected to the induction heating coil so that each of said integrated switches corresponds to one of the pairs of said intermediate contact points, wherein one of the plurality of moving electrodes selectively moves to make contact with corresponding one of the plurality of pairs of said fixed electrodes such that said contact points of one of the plurality of pairs of said intermediate contact points are electrically connected to each other;

a holding furnace which maintains a temperature of the heated steel sheet at a predetermined temperature for a predetermined period of time; and a cooling zone which cools the steel sheet.

* * * * *